Patented Mar. 3, 1953

2,630,409

UNITED STATES PATENT OFFICE 2,630,409

PAINT AND VARNISH REMOVER

Walter M. Bruner and James C. Lehr, Wilmington, Del., assignors to E. I. du Pont de Nemours & Company, Wilmington, Del., a corporation of Delaware No Drawing. Application October 6, 1949, Serial No. 119,993

5 Claims. (Cl. 252—144)

This invention relates to the removal of paint, varnish, lacquer, and enamel finishes from surfaces bearing films of the same.

Compositions which are useful for removal of lacquer films, paint films, etc. have been disclosed heretofore, e. g. in the Ellis Patent 1,884,633. In general, these previously known compositions have contained paraffin wax dissolved in a mixture of volatile hydrocarbon and acetone or similar organic solvent. The paraffin wax in these previously known compositions had the effect of decreasing the rate of evaporation without destroying the solvent action of the hydrocarbon and acetone ingredients.

An object of this invention is to provide an improved composition and method for removal of films of paint, varnish, lacquer, etc., from surfaces, said composition being characterized by relatively low volatility (compared with the volatility of acetone) and excellent film-dissolving or film-dispersing properties.

The novel composition employed in the method of this invention comprises a mixture of 1,1,2-trimethoxyethane and a volatile organic liquid diluent of the class consisting of liquid aromatic hydrocarbons, liquid alkanes, and liquid chloroalkanes. In preferred embodiments the ingredients comprise 100 parts by weight of 1,1,2-trimethoxyethane and from 10 to 100 parts by weight of the said diluent, preferably benzene, toluene or ethylene dichloride, based on the weight of 1,1,2-trimethoxyethane.

In addition to the ingredients specified above, the composition of the present invention may also contain a bodying agent such as cellulose ether or ester. The alkyl ethers of cellulose having not more than two carbon atoms in the said alkyl radicals are quite satisfactory for this purpose. These bodying agents have the effect of increasing the viscosity of the composition and making it more suitable for application to vertical surfaces. The quantity of bodying agent required is preferably within the range of about 1% to 5% based upon the total weight of the mixture, although, of course, somewhat larger quantities may be employed in certain instances if a more highly viscous composition is desired.

The addition of about 1% to 5% of oxalic acid has a marked activating effect upon the lifting action of 1,1,2-trimethoxyethane. Glycolic, lactic, and phosphoric acids also activate 1,1,2-trimethoxyethane. For best results an acidic constituent should therefore be present, preferably to the extent of about 1% to 5% based upon the weight of final composition.

In some instances the addition of water and a wetting agent (e. g. sodium dioctylsulfosuccinate, sulfated castor oil, sodium alkyl sulfates, etc.) is beneficial especially when the finish to be removed is quite difficult to separate from the surface to which it adheres.

A few tenths of a percent of paraffin wax (e. g. about 0.1% to 0.5%), based on the weight of the final composition may be present in the composition of this invention. It has been observed, for example, that as little as 0.1% of paraffin has a perceptible effect in decreasing the rate of evaporation, especially when the mixture is exposed to the atmosphere for prolonged periods of time (e. g. from several hours to two or three days). In general, however, the addition of paraffin to the composition is not necessary.

The effect of the aforesaid diluents on the lifting action of 1,1,2-trimethoxyethane is shown in the following table, which records the results obtained in tests wherein a film of alkyd resin primer was in each instance completely removed from a steel surface by subjecting the said film to the action of the described composition.

TABLE I

*The effect of diluents on the "lifting action" of 1,1,2-trimethoxyethane*

| Sample Number | Compositions Tested as Paint Removers | | | | | | | Time for Complete Removal (Minutes) |
| --- | --- | --- | --- | --- | --- | --- | --- | --- |
| | TME, Percent | Oxalic Acid, Percent | Ethyl Cellulose, Percent | Benzene, Percent | Toluene, Percent | Ethylene Chloride, Percent | Mixed Liquid Alkanes | |
| TME Control | 94 | 3 | 3 | | | | | 4 |
| 1 | 84 | 3 | 3 | 10 | | | | 2 |
| 2 | 69 | 3 | 3 | 25 | | | | 2 |
| 3 | 47 | 3 | 3 | 47 | | | | 3 |
| 4 | 84 | 3 | 3 | | 10 | | | 1½ |
| 5 | 69 | 3 | 3 | | 25 | | | 1½ |
| 6 | 47 | 3 | 3 | | 47 | | | 2½ |
| 7 | 84 | 3 | 3 | | | 10 | | 1½ |
| 8 | 69 | 3 | 3 | | | 25 | | 1½ |
| 9 | 47 | 3 | 3 | | | 47 | | 2½ |
| 10 | 84 | 3 | 3 | | | | 10 | 2 |
| 11 | 69 | 3 | 3 | | | | 25 | 2 |
| 12 | 47 | 3 | 3 | | | | 47 | (¹) |

¹ Ethyl cellulose was insoluble.

It will be understood that the proportions of ingredients employed in the composition of this invention may be varied within fairly wide limits without deviating from the spirit and scope of the invention. The bodying agent and acid, for example, may be completely eliminated, but this leads to relatively inferior results. In general, the quantity of bodying agent and acid should not exceed the amount which can be dissolved in the liquid mixture. The bodying agent, in general, has no effect upon the solvent action of the remainder of the composition, and is employed primarily to facilitate adequate contact of the film with the liquid ingredients, especially when the mixture is applied to vertical surfaces; therefore the bodying agent is not an absolutely indispensible ingredient of the composition of this invention.

The 1,1,2-trimethoxyethane employed in the practice of the invention is obtainable by the process described in the Gresham and Brooks Patent 2,449,470, which issued on September 14, 1948.

We claim:

1. A paint and varnish removing composition which consists essentially of 100 parts by weight of 1,1,2-trimethoxyethane and from 10 to 100 parts by weight, based on the weight of 1,1,2-trimethoxyethane, of a volatile organic liquid diluent of the class consisting of aromatic hydrocarbons, alkanes, and chloroalkanes.

2. A paint and varnish removing composition consisting of 100 parts by weight of 1,1,2-trimethoxyethane, 10 to 100 parts by weight of a volatile organic liquid diluent of the class consisting of aromatic hydrocarbons, alkanes, and chloroalkanes, and from 1 to 5 parts by weight of oxalic acid per 100 parts of the total composition.

3. A paint and varnish removing liquid composition consisting of 100 parts by weight of 1,1,2-trimethoxyethane and 10 to 100 parts by weight of benzene, 1 to 5 parts by weight of oxalic acid per 100 parts of the total composition, and 1 to 5 parts by weight of ethyl cellulose per 100 parts of the total of the composition.

4. A paint and varnish removing liquid composition consisting of 100 parts by weight of 1,1,2-trimethoxyethane, 10 to 100 parts by weight of toluene, 1 to 5 parts by weight of oxalic acid per 100 parts of the total composition, and 1% to 5% by weight of ethyl cellulose per 100 parts of the total composition.

5. A paint and varnish removing liquid composition consisting of 100 parts by weight of 1,1,2-trimethoxyethane, 10 to 100 parts of ethylene dichloride, 1 to 5 parts by weight of oxalic acid per 100 parts of the total composition, and 1 to 5 parts by weight of ethyl cellulose per 100 parts of the total composition.

WALTER M. BRUNER.
JAMES C. LEHR.

REFERENCES CITED

The following references are of record in the file of this patent:

UNITED STATES PATENTS

| Number | Name | Date |
|---|---|---|
| 1,100,177 | Ellis | June 16, 1914 |
| 1,143,111 | Ellis | June 15, 1915 |
| 1,167,641 | Ellis | Jan. 11, 1916 |
| 2,321,557 | Sussman | June 8, 1943 |
| 2,321,593 | Gresham | June 15, 1943 |
| 2,351,195 | Dreyling | Jan. 13, 1944 |
| 2,499,470 | Gresham | Sept. 14, 1948 |